(12) United States Patent
Umbach

(10) Patent No.: US 6,826,648 B1
(45) Date of Patent: Nov. 30, 2004

(54) STORAGE CONTROL FOR EFFECTING SWITCHING COMMANDS

(75) Inventor: Gert Umbach, Freiburg (DE)

(73) Assignee: Micronas GmbH (DE)

( * ) Notice: Subject to any disclaimer, the term of this patent is extended or adjusted under 35 U.S.C. 154(b) by 825 days.

(21) Appl. No.: 09/664,644

(22) Filed: Sep. 19, 2000

(30) Foreign Application Priority Data

Sep. 20, 1999 (DE) .......................................... 199 45 004

(51) Int. Cl.[7] .............................. G06F 12/00; G11C 7/00
(52) U.S. Cl. .................. 711/101; 365/189.01; 711/104; 711/167
(58) Field of Search ............................ 365/189.01, 191, 365/194; 711/100, 101, 104, 105, 167

(56) References Cited

U.S. PATENT DOCUMENTS

| | | | |
|---|---|---|---|
| 4,172,281 A | | 10/1979 | Gordon |
| 5,307,320 A | | 4/1994 | Farrer et al. |
| 6,230,245 B1 | * | 5/2001 | Manning ..................... 711/167 |
| 6,553,472 B2 | * | 4/2003 | Yang et al. .................. 711/167 |

FOREIGN PATENT DOCUMENTS

| EP | 0 619 546 A | 10/1994 |
|---|---|---|

OTHER PUBLICATIONS

Yasuhiro Takai, et al., "250 Mbyte/s Synchronous DRAM Using a 3–Stage–Pipelined Architecture", IEEE Journal of Solid–State Circuits, vol. 29, No. 4, pp. 426–431 (Apr., 1994).

Yuji Sakai, et al., "A Synchronous DRAM with New High-Speed I/O Lines Method for the MultiMedia Age", IEICE Trans. Electron., vol. E78–C, No. 7, pp. 782–788 (Jul., 1995).

Hitachi Hardware Manual, Hitachi SuperH Rise engine, SH7750 Series, SH7750, SH7750S, Rev. 4.0, Apr. 21, 2000.

\* cited by examiner

Primary Examiner—Gary Portka
(74) Attorney, Agent, or Firm—Harness, Dickey & Pierce, P.L.C.

(57) ABSTRACT

A storage control for implementing switching commands for access to storage cells for writing or reading data receives control commands which are allocated to the data. The storage control has a command set for at least one memory type with command sequences of individual switch commands to be processed in a predetermined succession, which are activated by the control commands one after another at a predetermined time after the activation of the preceding switch command. Here, depending on the previous switch command and the current control command, there is created an activation command, which activates the current switch command. Moreover, the storage control contains information items allocated to the storage cells which indicate the predetermined time for the respective switch command.

19 Claims, 5 Drawing Sheets

STORAGE CONTROL FOR EFFECTING SWITCHING COMMANDS

BACKGROUND OF THE INVENTION

1. Technical Field

The invention concerns a storage control for implementing switching commands for access to storage cells for the writing and reading of data, which receives control commands allocated to the data, contains a command set for at least one storage type with command sequences of individual switch commands to be processed in a predetermined succession which are activated by control commands, which activates the switch commands of a command sequence corresponding to the current control command one after another, and activates the current switch command at a predetermined time after the previous switch command.

2. Discussion

A storage control of this kind may be used anywhere where for the purpose of electronic data processing data are stored in digital form in the storage cells of a memory. This is for example the case with computers. Increasingly, such storage controls are used with television apparatuses. The ever more complex control processes of electronic apparatuses are executed with the help of so-called micro controllers, which then also require a storage control. Examples here to be cited are control devices in the instrument panel of motor vehicles or even in more recent times developing navigation systems.

For write- or read- access to storage cells, control commands are allocated to the data which are to be written or read from these storage cells, which control commands for example contain information items about the storage address and whether there is to be a write or read situation. With the current memories, as for example SGRAM, SDRAM, MDRAM, PBSRAM etc., the control commands for writing and reading are sequences made up of individual commands. Technically conditioned, the switch commands corresponding to these control commands, respectively, are different for the individual storage types. A storage control is therefore generally associated with a special storage type and contains the specific command set for this type. Corresponding to the control commands, there is selected by the storage control for every command of a command sequence the corresponding switch command from the command set, and is activated. In this case the selection of the respective switch command depends on the respective control command and the previous switch command.

In order to execute the respective switch command a certain time scale is required. This certain time depends on the switch command itself and the storage type. With some storage types the certain time can also depend on the previous switch command. Partly, it is also possible in the so-called burst mode to gain access in parallel to the storage cells of some storage types. In order that these possibilities can be used meaningfully in respect of a more rapid processing speed, the storage control must accordingly implement these accessions in overlap.

Should one wish to use differing storage types with a data-/signal processing system, it is at present necessary to use the storage control associated with the respective storage type, in order to be able to use efficiently the respective, specific possibilities of this storage type. It should furthermore be born in mind that in the future other storage types with additional access possibilities may come on the market, which then also necessitate their own individual storage control.

In order to be able to apply a storage control more flexibly or in order not to be set with an existing switching on one storage type, it is desirable that several storage types can be controlled with one and the same storage control. A recently marketed storage control SH7708 from the firm Hitachi makes possible the use of DRAM, SDRAM, and PSRAM. It is certainly true that with this known storage control the specific advantages and options of the individual storage types are used insufficiently, for example, access to SDRAM memory is not effected in parallel in the so-called burst mode. This leads to losses in speed.

SUMMARY OF THE INVENTION

It is a task of the invention to indicate a storage control for the control of access to storage cells for the writing and reading of data, which can be quickly and simply changed over to the specific options of a certain storage type and which thereby uses efficiently the specific options of the respective storage type.

The task is solved by a storage control of the type mentioned at the beginning in that, dependent on the previous switch command and the current control command, the current switch command is activated, and that information items allocated to the storage cells can be supplied to the storage control which information items indicate the aforementioned predetermined time.

In this way, various predetermined times can be assigned to the respective switch command, dependent on which switch command was executed previously. Thus it can be achieved that for every switch command only the shortest necessary time has to be used. In this way altered performance characteristics of a type of memory may be taken into account simply by another command set and other predetermined times being used. In this way the storage control according to the invention can be used simply and flexibly.

In one development of the invention, a reference value is stored in a register for every switch command. The reference value here can correspond to the predetermined time and the register can be a write/read memory. In this way, with the use of different storage types, the predetermined time for each switch command can be altered particularly easily.

If a counter in the case of a further development counts the impulses of an impulse series since the activating of the switch command, the predetermined time for each switch command can be particularly easily measured.

In such a case it is of advantage if the counter reading is compared with the reference value, and if a signal is created, if the counter reading is the same as the reference value. A comparison of the counter reading with the reference value is achieved easily technologically and the signal can be used simply for activating the subsequent switch command. Preferably the signal is then registered and upon registering the signal the next switch command activated.

In a further development at least one switch command is already activated before the registration of the signal. In this way switch commands can be considered whose implementation demands only a relatively short time. In this case, no additional value for a predetermined time has to be stored anywhere.

In a further development of the invention the reference values for the switch commands are written in a set-up process into the register. Before the actual insertion of the storage facility in this way, by the writing of reference values into the register, the storage control can be rapidly and simply changed over to the specific options of a specific storage type.

In a further development of the invention the register also contains a value for the time after which the memory content should be refreshed. In the case of the dynamic memories typically used nowadays, a refreshing of the memory storage content is necessary after a certain time. By means of the above-described method, the elements described here up to now can also be used for preparation of the time for the refreshing process.

In a further development of the invention, a device is provided which creates a signal, if the current control command belongs to a new command sequence. This signal can be used advantageously for controlling the operation.

In a further development of the invention, operational control commands are created by the storage control for the running of individual switch commands of the command sequence in predetermined succession. This measure gives to the storage control in a simple manner the possibility of allocating the individual switch commands of a command sequence by means of the operational control commands.

In a further development of the invention activation commands are stored in a second register. The activation commands themselves are relatively independent of the storage type used and can therefore be used for various storage types. In order to adapt storage control to performance characteristics of another storage type, it is sufficient in such a case simply to execute the adaption of the predetermined time for the respective switch command, wherein the predetermined time can be stored in the first register.

Preferably, the switch commands are stored in a third register. In this fashion, the content of the register to be adapted can be overwritten.

With this further development, if the third register is a write/read memory or a programmable read-only-memory, in which switch commands are written in an initialization process, the storage control can be adapted through simple inscription of the switch commands into the third register before the insertion of the storage control to the specific performance characteristics of the storage type used.

A further development of the invention is distinguished by a signal being created if the current command sequence concerns the storage cells of the same line of the memory as the previous command sequence. If the storage cells of the storage type used can be used in the so-called burst mode, this signal can be utilized to control the storage cells accordingly.

The command set for the respective storage type can be determined by means of information items allocated to the storage cells. This is particularly advantageous when the storage control contains command sets for several different storage types. In this case the storage control then uses the command set suited to the respective storage type.

In a further development of the invention a signal is created when the writing or reading is over. This signal can be used with advantage to control the running.

Preferably, the signal can be returned with the address of origin for the access after its conclusion, e.g. it can be notified with the signal to the relevant processor that has caused the access, that the access has been concluded.

In such a case a signal can be created if the current switch command is the first switch command of a new command sequence. This signal can be used advantageously, for example, for measuring the time that has elapsed since the initiation of a command sequence.

If then the information items allocated to the storage cells also indicate the time after which after activating the first switch command of the respective new command sequence the writing or reading respectively is concluded, it is possible for the signal to be created at the time following the registering of the signal.

BRIEF DESCRIPTION OF THE DRAWINGS

In the following, an embodiment of the invention is set out with the aid of drawings, which show.

DETAILED DESCRIPTION OF THE PREFERRED EMBODIMENTS

Figure 1:
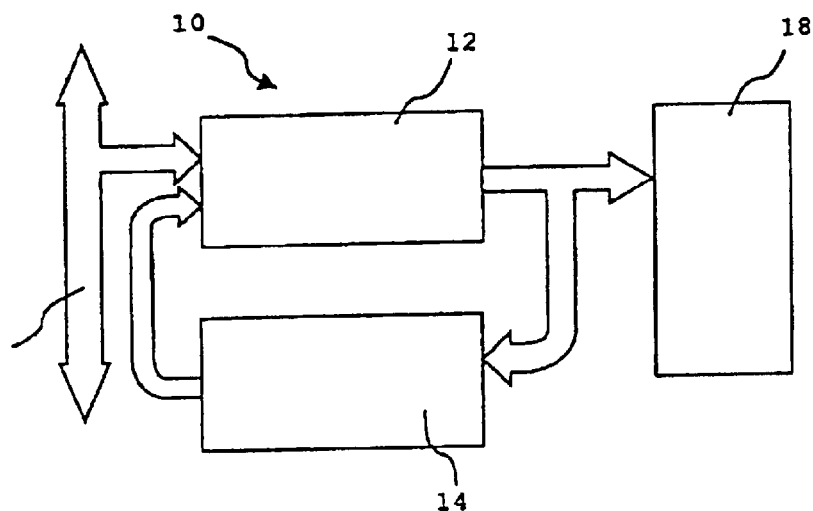
FIG. 1 a known storage control.

FIG. 1 shows a schematic view of a known storage control 10. The storage control 10 has a switch unit 12 and a status memory 14. The switch unit 12 is linked up with a bus 16 and a working memory 18. The control commands allocated to the data to be written into the storage cells of the working memory 18 are transmitted via bus 16 to switch unit 12. The switch unit 12 receives from status memory 14 information items about the switch command previously transmitted to the working memory 18. Dependent upon the control commands and the previous switch command, switch unit 12 selects a switch command from a stored command set and activates this switch command. By means of this switch command the relevant storage cell of working memory 18 is switched to a following status.

Figure 2:
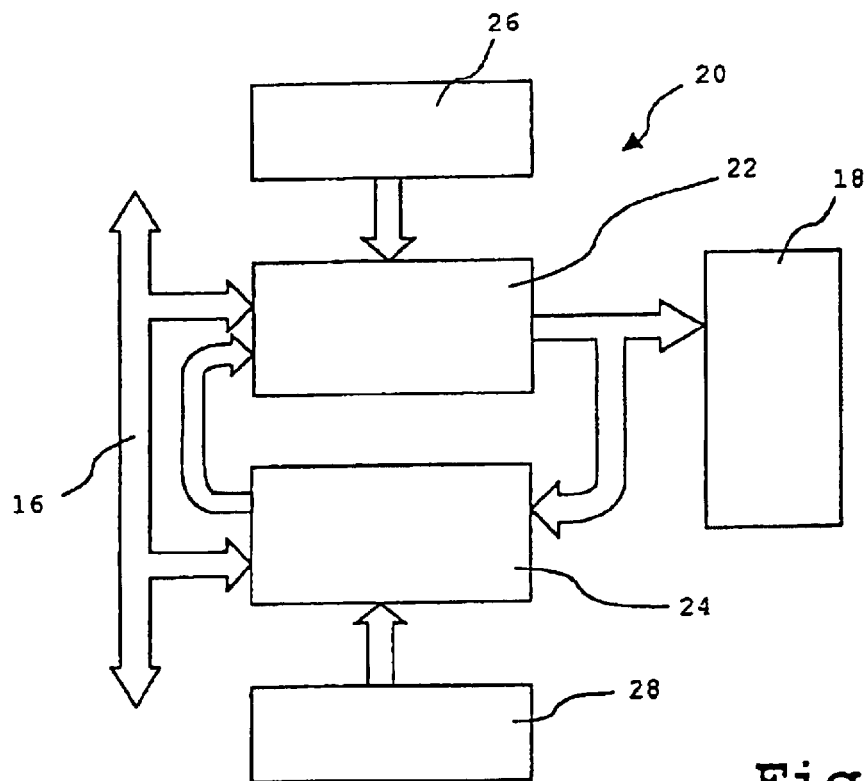
FIG. 2 a schematic representation of a storage control as an embodiment.

FIG. 2 shows a diagrammatic representation of a storage control 20 as an embodiment of the invention. The storage control 20 has a switch unit 22 and a status memory 24. It is possible for the corresponding command set to be input via an input unit 26 to switch unit 22 for access to the working memory 18. For this purpose, switch unit 22 has at its disposal a write/read memory (RAM), to which further reference will be made in what follows. The information items stored in this write/read memory remain conserved even during switch-off of the apparatus with storage control 20 because of the fact that a battery not shown is provided, which supplies current to this write/read memory in a familiar way.

A further input unit 28 serves to feed the necessary information items about the storage type of working memory 18 to the status memory 24. To this end, the status memory 24 also has a write/read memory buffered with a battery in a known manner as a register, to which more detailed reference will be made in what is to follow. Here, the input unit 28 is representative. Possibilities are an input via a keyboard, an input via bus 16 or an input from a parameter memory allocated to the working memory 18. There will not be any further details given in what follows on the nature of the input with input units 26, 28.

The status memory 24 stores information items about the previously executed switch command in working memory 18. Depending on the information items about the working memory 18 input with input unit 28 and depending on control commands which are input into status memory 24 via bus 16, status memory 24 transfers operational control commands to switch unit 22. Switch unit 22, depending on the operational control commands and the control commands it receives from bus 16, selects a switch command from out of the command set input from input unit 26, and activates this switch command. Through this switch command access is then gained to the corresponding storage cell of working memory 18.

Figure 3:
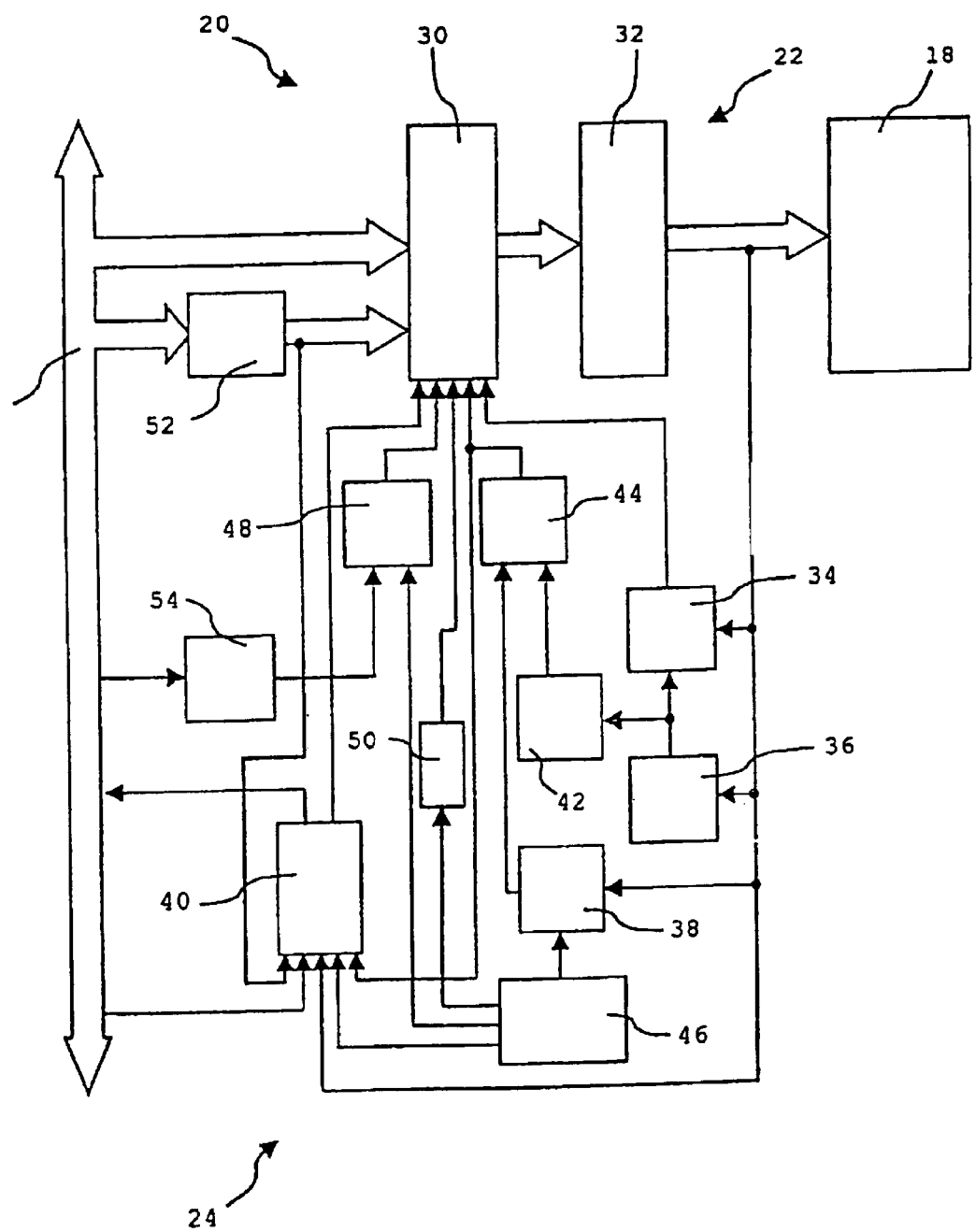
FIG. 3 a block circuit diagram of the storage control according to FIG. 2 in a schematic view, and FIG. 4 a block circuit diagram of the module for creating an activation command of FIG. 3, FIG. 5 a block chart of the running of a process for the effecting of access to storage cells according to the invention, and FIG. 6 a block chart of the procedural steps combined in step S26 in FIG. 5 for creating the signal DATAVALID.

FIG. 3 shows schematically a circuit arrangement of storage control 20 according to FIG. 2. Similar elements have the same reference numbers. Switch unit 22 has a program memory 30 and an output memory 32. Although not shown in FIG. 3, there is a timing generator which creates an impulse sequence according to which the individual elements of the storage control 20 work in synchronization.

The status memory 24 has an intermediate memory 34, a module 36 for recognition of a switch command, a module 38 for ascertaining the predetermined timing frequency for the current switch command and a module 40 for creating a binary signal DATAVALID, which are linked up respectively to output memory 32.

Module 36 moreover is linked up with intermediate memory 34 and with a counter 42 for counting the timed impulses. Counter 42 and module 38 are respectively linked up with an inlet of a comparator 44, whose output is linked up to program memory 30 and module 40 respectively.

Module 38 is linked up to a register 46. Moreover, register 46 is linked up to module 40, a comparator 48 and a counter 50. The status memory 24 moreover has a module 52 for creating a binary signal NEW ACCESS and a counter 54. The inlet of module 52 is linked up with bus 16. The outlet of module 52 is linked up with program memory 30 and module 40. Module 40 moreover is also linked up directly with the bus. The inlet of counter 54 is linked up with bus 16. The outlet of counter 54 is linked up with comparator 48.

On switching on the power supply, a switch-on signal is transferred via bus 16 to counter 54. The counter 54 begins thereupon to count the timed impulses. Module 48 receives from register 46 information items about the working memory 18 used and the switch commands to be executed for the initializing of the same. Module 48 moreover receives from register 46 the number of timed impulses which will be needed for effecting the initializing process. Should counter 54 not have achieved the value predetermined by the register 46, module 48 passes on the information items for the initializing procedure to program memory 30. Program memory 30, corresponding to the control commands transferred to it via bus 16 and the information items transferred to it from the module 48, creates activation commands, which it transfers to the output memory 32. These activation commands trigger the switch commands for the initializing process stored in output memory 32. A so-called Flush-EEPROM is particularly suitable as an output memory 32. With this kind of electrically erasable read-only-memory, the whole storage content can be erased with a single erase impulse of several seconds in length. Should the value of counter 54 attain the value predetermined by the register 46, module 48 recognizes that the initializing procedure is thus at an end. Thereafter no further information items are conveyed from register 46 to program memory 30.

Register 46 passes on to counter 50 a value for the number of timed impulses corresponding to the time, after which respectively there should ensue another refreshing of the storage content of working memory 18. The counter 50, once it has counted up to the value transferred to it from register 46, sends out a signal for the further refreshment of the storage content of working memory 18 to program memory 30. Usually there is also arranged a so-alled arbiter between counter 50 and program memory 30. The arbiter is supposed to prevent conflicts between the normal memory access and the further refreshing process. In order to assist a better possibility of overview, the arbiter has been omitted in FIG. 3.

Whenever a new control command is transferred via bus 16 to the storage control 20, module 52 first verifies whether this control command is to activate a new command sequence. The result of this verification is transferred as a binary signal NEW ACCESS to program memory 30 and to module 40.

Intermediate memory 34 is where the last of the switch commands activated by output memory 32 is stored. When comparator 36 recognizes that a switching operation has been executed by working memory 18 because of this switching command, it causes the intermediate memory 34 to transfer the stored switch command to program memory 30. Moreover, in this case the counter 42 which counts timed impulses is started. A module 38 reads from register 46 a reference value $Z_{soll}$ for the number of timed impulses that are needed for the operating of the switch command. Comparator 44 compares the current reading of counter 42 with the reference value $Z_{soll}$ prescribed by module 38. Once the value Z of counter 42 has attained the reference value $Z_{soll}$, a binary signal READY is transferred to program memory 30 and module 40. By means of this binary signal, program memory 30 recognizes that the previous switch command has been operated, selects a switch command from output memory 32 according to the next control command transferred via bus 16, and activates this next switch command.

A few switch commands can also be activated before the transfer of the binary signal READY to program memory 30. This is recognized by the program memory, and the relevant switch command is activated, as soon as the associated control command is transferred to it.

Module 40 receives from output memory 32 information items about the switch command just carried out. Module 40 receives the binary signal READY from comparator 44, and module 40 receives from register 46 information items about the storage type used in working memory 18. Module 40 receives from module 52 the binary signal NEW ACCESS and a binary signal $\overline{rd}$/wr, which is a part of the control command, from bus 16. The binary signal $\overline{rd}$/wr designates whether it is a matter of a write- or read access. In the light of this information, module 40, as described in more detail in what follows, creates a binary signal DATAVALID which is transferred to bus 16. This binary signal DATAVALID designates whether the write-/read access is at an end. Moreover, module 40 creates a binary signal SAME LINE, if the command sequence for the current access concerns a storage cell of the same line as the command sequence of the preceding access. This binary signal SAME LINE is also transferred as a further operational command signal to the program memory 30.

Figure 4:
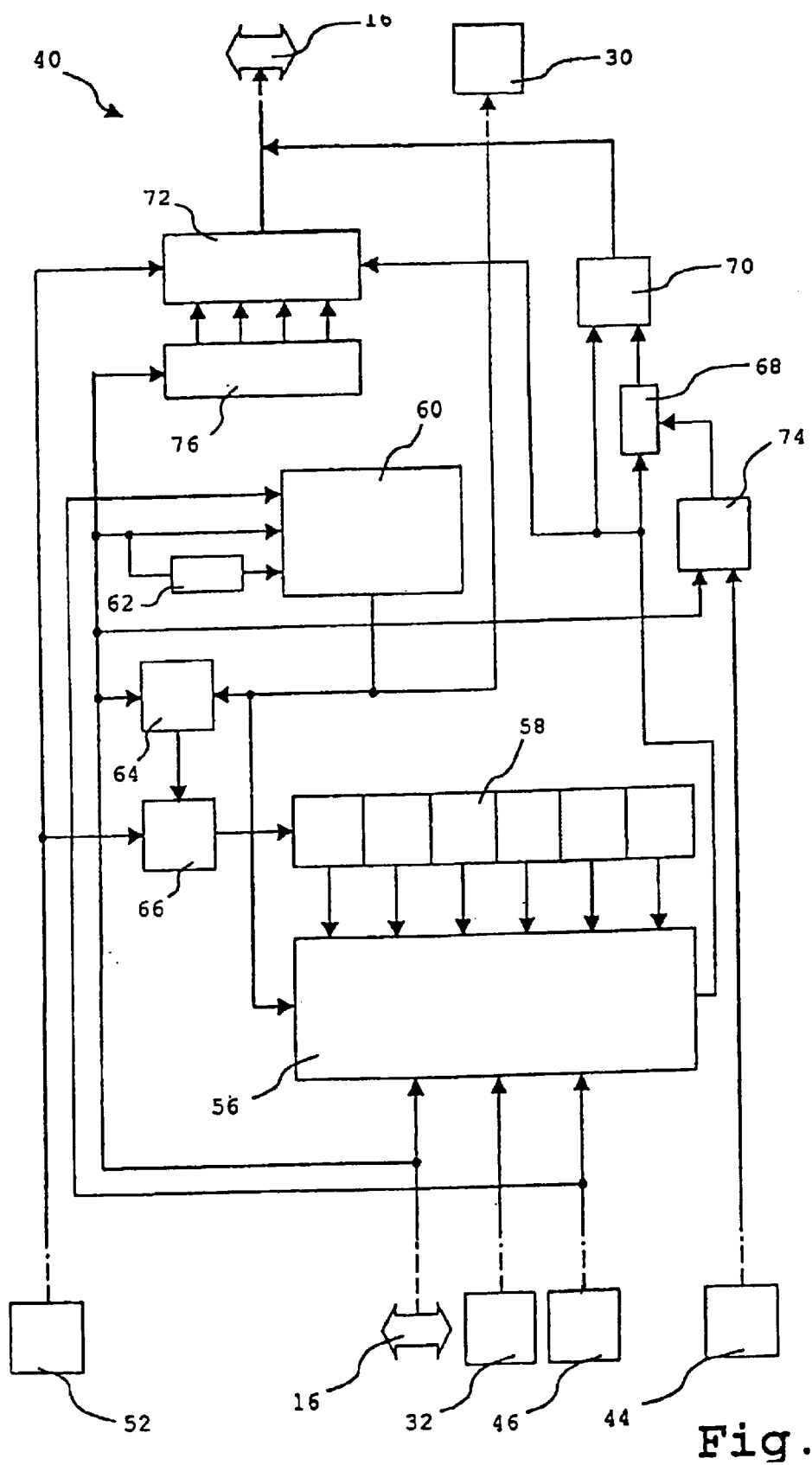

FIG. 4 shows schematically the individual elements of module 40 of FIG. 3. For easier inspection, also those elements are drawn with which module 40 in FIG. 3 is linked. Module 40 has a selection element 56 and a storage element chain 58, wherein every storage element of the storage element chain 58 is linked up with selection element 56 respectively. Moreover, the selection element 56 is linked up to register 46, output memory 32, bus 16, and a module 60 for creating a binary signal, which indicates the possibility of a parallel storage access.

Module 60 is linked once directly and once through intermediate switching of an intermediate memory 62 with bus 16. Moreover, module 60 is linked up to register 46. The outlet of module 60 is linked up with an inlet of a AND-gate 64, whose other inlet has a connexion with bus 16. The outlet of the AND-gate is linked up to the inlet of an OR-gate 66. The other inlet of the OR-ate 66 is linked up to module 52 in FIG. 3. The outlet of the OR-gate 66 is linked up to the first storage element of storage element chain 58.

The outlet of selection element 56 is linked up to an intermediate memory 68, with an OR-gate 70 and with a switch element 72. The intermediate memory 68 is also linked up to the OR-gate 70. The intermediate memory 68 has a control inlet for resetting that is linked up to the outlet of an OR-gate 74. An inlet of the OR-gate 74 is linked up to bus 16 and the other inlet with comparator 44. The switch element 72 is moreover linked up to module 52 and a FIFO memory chain 76, which in its turn has a connexion with bus 16.

Module 60 receives from bus 16 the storage address for which the current switch command should hold good. This address is compared by module 60 with the storage address for the previous switch command which address is stored in intermediate memory 62. These two storage addresses are compared by module 60 with information items about the working memory 18, which register 46 transfers to module 60. With the help of these information items stored in register 46, module 60 checks whether the current storage address and the previous storage address belong to the same line of the working memory 18, or whether the current storage address belongs to a storage bank of working memory 18 different from the previous address. In such cases, there is a possibility of a partial overlap of the current command sequence and the previous command sequence with specific storage types. A binary signal SAME LINE is then created by module 60 and transferred to the AND-gate 64 and to the selection element 56. Moreover, the binary signal SAME LINE is transmitted to the program memory 30.

If the AND-ate 64 receives from bus 16 a binary signal INTERRUPT at the same time as the binary signal SAME LINE, this means that a new write/read access to a storage element is to be performed on the same line as with the previous access. In such a case, a binary value 1 is passed on to OR-gate 66. If either a binary value 1 is transmitted from the AND-gate 64, or the binary signal NEW ACCESS from module 52 to the OR-ate 66, this also transmits a binary value 1 to the first storage element of storage element chain 58.

With every timing of the timed impulse series this binary value is moved on by one storage element in the storage element chain 58. The storage element chain 58 in FIG. 4 has six schematically represented storage elements. Of course, the storage element chain 58 may however also have another number of storage elements. The selection element 56 receives from register 46 a value $DVZ_{soll}$, which indicates for the respective switch command the necessary number of timing impulses. The selection element 56 receives from output memory 32 a binary signal WE, which designates whether something is being written into a storage cell according to the previous switch command. Moreover, the selection element 56 receives from bus 16 a binary signal rd/wr, which designates whether with the next switch command something is to be written into or read out of a storage cell.

Corresponding to the value $DVZ_{soll}$ given out in register 46 for the combination SAME LINE, rd/wr, WE for the used working memory 18, selection element 56 transmits the binary value 1 from the corresponding storage element of storage element chain 58, after operating the predetermined $DVZ_{soll}$ number of timing impulses to intermediate memory 68, the OR-ate 70 and the switch element 72. Once this binary signal is transferred from selection element 56 to OR-gate 70, the latter passes on the binary signal DATAVALID to the program memory 30 in FIG. 3.

When the OR-gate 74 receives the signal READY from comparator 44 or the signal INTERRUPT from bus 16, the OR-gate effects a resetting of the value in intermediate memory 68 to zero.

In the FIFO storage element chain 76, several source addresses transferred from bus 16 for storage accesses to be implemented can be stored. When the signal NEW ACCESS has been registered from module 50, switch element 72 causes the storage of the currently transferred source address into the FIFO storage element chain 76. In the succession of the storage operation switch element 72 gives the first stored storage source request upon registering the binary signal DATAVALID from selection element 56 back to bus 16.

Figure 5:
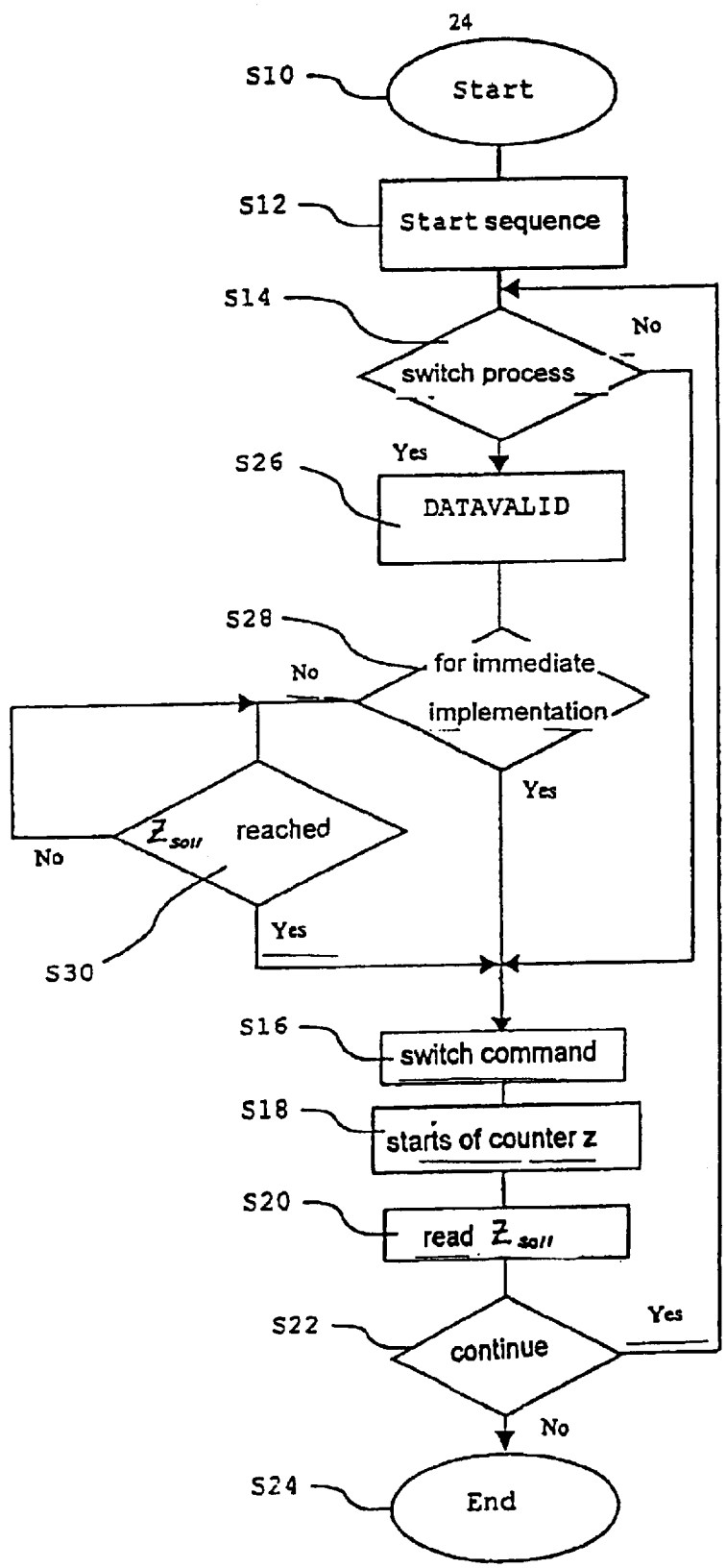

FIG. 5 shows a block diagram of the operation for activating switch commands for access to storage cells for writing and reading data, which is carried out by storage control 20 according to FIG. 2. The operation begins with step S10. There then follows step S12, in which a start sequence for the respective storage type is carried out. In order for the memory to be brought into a defined start condition after switching on the power supply, a series of specific switch commands must be executed. The nature and succession of these switch commands of the start sequence are transmitted to the program memory 30 from the register 46 in the embodiment described here.

Step S14 then checks next whether there has previously been executed a switch process. If this is not the case, the next step is step S16. In step S16 there is selected according to the control commands a switch command from the stored command set, which is then activated. Subsequently, a step S18 starts up a counter Z. Thereafter, in step S20, a reference value is read out of register 46 for the just activated switch command.

Subsequently, a step S22 checks whether there is a further control command to process. Should this be so, the operation is branched back to step S14. Otherwise, the procedure is concluded with step S24.

If It is acknowledged in step S14 that previously a switch process has been executed, then step S26 follows. In step S26, a series of procedural steps are combined, to which more detailed reference will be made in the following.

There then follows S28, in which it is checked whether the desired switch process can be carried out straightaway. If so, the next step is the activating of the current switch command in step S16.

Otherwise, in step 30 the current counter reading of counter Z is compared with reference value $Z_{soll}$ Until the counter Z has attained the reading $Z_{soll}$, the comparison is repeated in a loop. As soon as the counter Z has attained the reference value $Z_{soll}$ there follows the activating of the current switch command in step S16.

Figure 6:
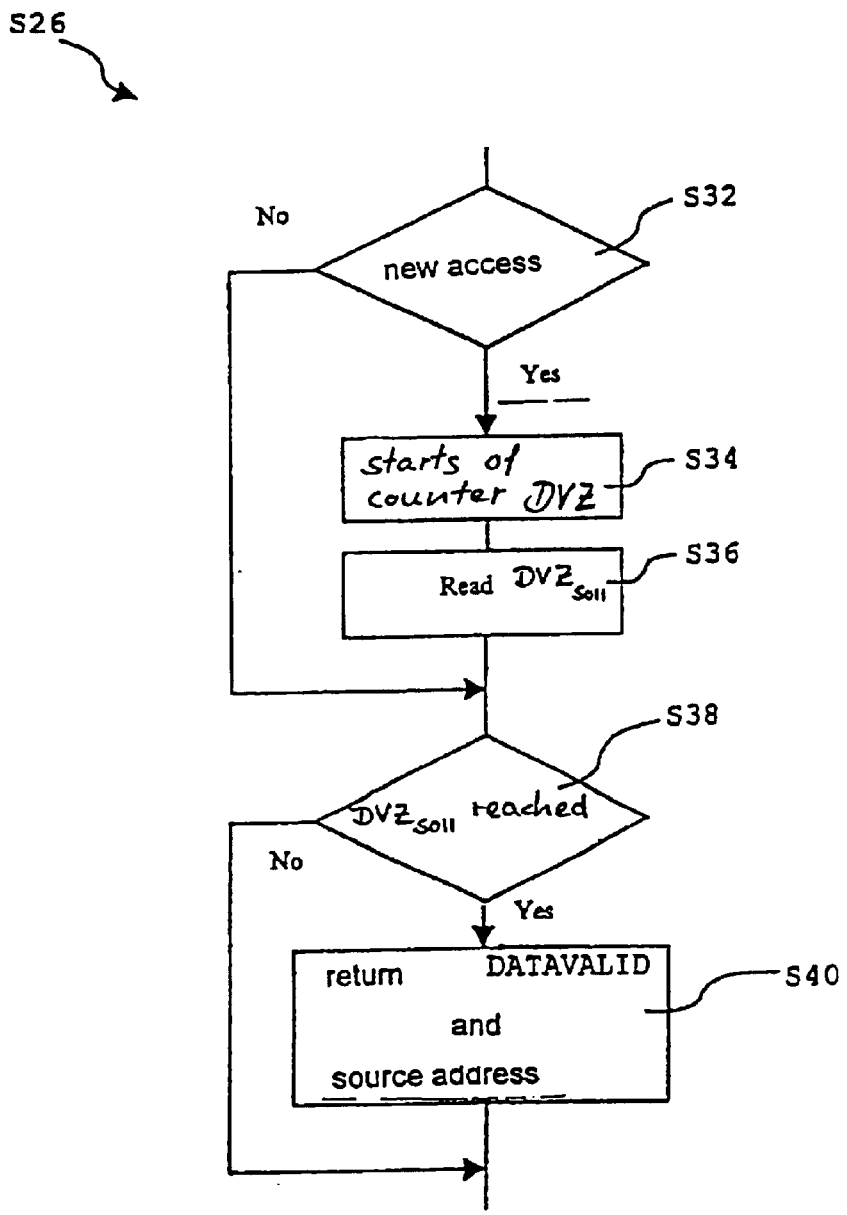

FIG. 6 shows the procedural steps combined in step S26 of FIG. 5 for creating the signal DATAVALID. First, a check is made in step S32 whether the current control commands belong to a new command sequence, i.e. to a new access. If so, as the next step a counter DVZ is started in step S34. Step S36 comes next. In the step S36 a reference value $DVZ_{soll}$ is read out of register 46.

Next, a check is made in step S38 whether the counter DVZ has reached the reference value $DVZ_{soll}$. Should this not be so, there next ensues step S28 in FIG. 5. If step S38 has found that counter DVZ has reached the reference value $DVZ_{soll}$ then step S40 comes next. Here a signal DATAVALID is created and given back together with the source address. In this way, it is communicated that the storage access by the relevant processor has now been effected.

What is claimed is:

1. Storage control for executing switch commands for access to storage cells for writing and reading data, which storage control receives control commands allocated to the data, contains for at least one storage type a command set with command sequences of individual switch commands to be processed in a predetermined succession and activated by the control commands, which activates one after the other the switch commands of a command sequence corresponding to a current control command, and activates a current switch command at a predetermined time later than the preceding switch command, which activates the current switch command dependent on the previous switch command and the current control command, characterized in that information items allocated to the storage cells are capable of being supplied to the storage control, which information items indicate the predetermined time mentioned, that the storage control contains command sets for several different storage types, and that one command set can be determined bv the information items.

2. Storage control according to claim 1, characterized in that for every switch command a reference value (Zsoll) is stored in a first register (46).

3. Storage control according to claim 2, characterized in that a counter (42) counts the impulses of an impulse series after the activating of the switch command.

4. Storage control according to claim 3, characterized in that the counter reading (Z) is to be compared with the reference value (Zsoll), and that a first signal (READY) is created, if the counter reading (Z) is the same as the referehce value (Z soll).

5. Storage control according to claim 4, characterized in that the first signal (READY) is apprehended, and that on apprehending the first signal (READY) the next switch command is activated.

6. Storage control according to claim 5, characterized by at least one switch command that is already activated before apprehending the first signal (READY).

7. Storage control according to one of claims 2 to 6, characterized in that the reference values (Zsoll) for the switch commands are written in an installation process into the first register (46).

8. Storage control according to one of the previous claims, characterized in that the first register (46) also contains a value for the time after which the storage content is to be refreshed.

9. Storage control according to one of the previous claims, characterized by a device (52), which creates a second signal (NEW ACCESS), if the current control command belongs to a new command sequence.

10. Storage control according to one of the previous claims, characterized in that operational control commands are created by the storage control for the processing of the individual switch commands of a command sequence in the predetermined succession.

11. Storage control according to one of the previous claims, characterized in that the activating commands are stored in a second register (30).

12. Storage control according to one of the previous claims, characterized in that the switch commands are stored in a third register (32).

13. Storage controls according to claim 12, characterized in that the third register (32) is a write/read memory or a programmable read-only-memory, into which the switch commands are written in an initializing process.

14. Storage control according to one of the previous claims, characterized in that a third signal (SAME LINE) is created, if the current command sequence relates to storage cells of the same line of the memory (18) as the previous command sequence.

15. Storage control according to one of the previous claims, characterized in that the command set is determined for each respective storage type by means of information items allocated to the storage cells.

16. Storage control according to one of the previous claims, characterized in that a fourth signal (DATAVALID) is created, when the writing or reading is concluded.

17. Storage control according to claim 16, characterized in that the fourth signal (DATAVALID) is given back together with the source address for the access after the conclusion.

18. Storage control according to claim 16 or 17, characterized in that a fifth signal is created if the current switch command is the first switch command of a new command sequence.

19. Storage control according to claim 18, characterized in that the information items allocated to the storage cells also give the time, after which after activating the first switch command of each new command sequence, the writing or reading respectively is concluded.

* * * * *